United States Patent Office 3,371,987
Patented Mar. 5, 1968

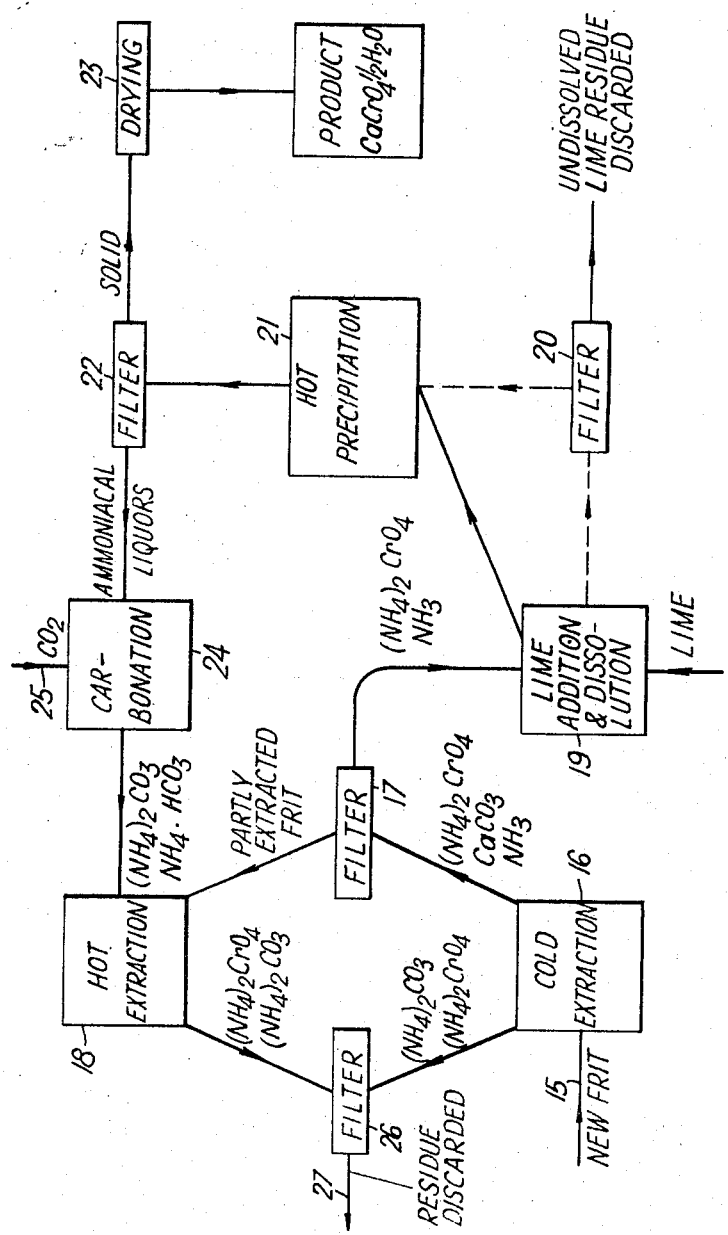

3,371,987
PROCESS FOR THE PRODUCTION OF
CALCIUM CHROMATE
Clifford Alfred Vessey and James Thomson Farquhar, Harrogate, England, assignors to Associated Chemical Companies Limited, Harrogate, England
Filed July 20, 1964, Ser. No. 383,638
4 Claims. (Cl. 23—56)

ABSTRACT OF THE DISCLOSURE

A process for the recovery of chromium values as calcium chromate from a roasted mix containing alkaline earth metal chromate comprising the steps of partly leaching said roasted mix in a first leaching step with a leach liquor containing, in a dissolved state, ammonia and carbon dioxide to yield an aqueous solution containing ammonium chromate and a partially extracted insoluble mix. The insoluble material is then removed to obtain a liquor containing, in a dissolved state, ammonia and ammonium chromate. This liquor is treated, at room temperature, with lime to yield an aqueous solution containing dissolved calcium chromate and ammonia. The calcium chromate-ammonia containing aqueous solution is then heated to a temperature sufficient to precipitate calcium chromate, the solid calcium chromate is separated from the mother liquor containing dissolved calcium chromate and ammonia, and the separated calcium chromate precipitate is then dried. The mother liquor which contains dissolved calcium chromate and ammonia is cooled and carbonated to give a suspension of calcium carbonate in a solution containing ammonium bicarbonate and ammonium chromate. The partially extracted roasted mix which resulted from the first leaching step is then leached with the carbonated mother liquor to yield an extracted residue and a leach liquor containing, in a dissolved state, ammonia, carbon dioxide and ammonium chromate. The extracted residue is then discarded, and the leach liquor is utilized to leach a fresh quantity of roasted mix.

This invention relates to the production of chromium compounds from chromium-bearing ores.

The most widely practised method of extracting chromium from one of its ores is to roast the ore with soda ash in air at an elevated temperature, whereupon the chromium is converted into sodium chromate. This sodium chromate is then leached from the roasted material with water, and upon treatment with sulphuric acid may be converted to sodium dichromate. The principal advantage of this method of extracting chromium is that by roasting the ore with the soda ash in a kiln open to the atmosphere a high proportion of the chromium is converted into water-soluble chromate. The principal disadvantage of the process is that at best less than one half of the sodium in the soda ash that is used in the roasting step is eventually sold combined with chromium as a product of a chrome-extracting plant. Even assuming 100% efficiency during the roasting step, half the sodium present in the sodium chromate leached from the roasted material is lost as sodium sulphate upon treatment with sulphuric acid. Because compounds such as impure sodium sulphate are of low value compared with soda ash this represents a substantial economic disadvantage of the conventional process. A further disadvantage is that the chromium is obtained as a sodium compound, but a substantial proportion of the chromium is in fact required in the form of compounds which contain no sodium, for example chromic acid and chromic oxide.

It has been proposed to replace the relatively expensive soda ash by lime, which is cheaper, and upon roasting the chromium-bearing ore and lime, together with a small proportion of soda ash if desired, to convert the chromium to calcium chromate and recover the chromium as the more soluble calcium dichromate. However, this process is un-economic, because in order to obtain any substantial conversion of the chromium into chromate the roasting must be carried on for so long a time that the cost of the fuel offsets the saving in cost obtained by using lime.

A novel process of roasting a chromium-bearing ore with lime, or in general with an oxide, hydroxide or carbonate of magnesium or an alkaline earth metal, is disclosed and described in an application filed by Clifford A. Vessey, July 20, 1964, Ser. No. 383,614. In that process, a chromium-bearing ore is roasted with an oxide, hydroxide or carbonate of magnesium or of an alkaline earth metal in an atmosphere in which the partial pressure of oxygen is appreciably greater, that is to say, at least 30% greater, than the partial pressure of oxygen in air at atmospheric pressure. The result of increasing the partial pressure of oxygen is quite markedly to accelerate the reaction, and the process becomes economically attractive even when the partial pressure of oxygen is increased by as little as 30%, for instance to 200 millimetres of mercury.

We have now discovered a method for recovering the chromium values as calcium chromate from a roasted mix containing alkaline earth metal chromate prepared by the process disclosed by Vessey, or prepared by any other process which involves roasting a chromium-bearing ore with the oxides, hydroxides or carbonates of an alkaline earth metal. In our invention, we leach the roasted mix with an aqueous solution containing dissolved ammonia and dissolved carbon dioxide to form a solution of ammonium chromate, and to precipitate the alkaline earth metal as the carbonate. The solution of ammonium chromate is then saturated with lime to form a solution of calcium chromate; this calcium chromate is precipitated by heating the solution, filtered off and dried to form the desired product.

In the process described by Vessey, the mixture of chromium-bearing ore and alkaline earth metal compound to be subjected to roasting is preferably finely ground since in general, the finer the grinding the faster the rate of reaction. In the conventional roasting process employing soda ash the fineness of the ore is generally such that 90% of it passes through a 300-mesh B.S. (British Standard) sieve. A similar degree of fineness is suitable for the reactants in the present invention, but in some cases it may be desirable to grind the mixture more finely, say, to such an extent that 97% of it is smaller than 300 mesh in size. The finely ground mixture may then, if desired, be pre-pelleted. This procedure is particularly suitable when the process is carried out in a static furnace, since it assists intimate contact between the reactants. However, the fine powder may be used as such and the mixture is then preferably mechanically agitated. For example a rotary kiln may be used and the mixture may be given additional agitation by looped chains suspended inside the kiln. Alternatively a static furnace may be rabbled mechanically.

The process may advantageously be carried on continuously or semi-continuously, that is to say with continuous or semi-continuous removal of the roasted mix.

Once the roasting process has been completed it is important to cool the roasted mixture under such conditions that decomposition of the chromate in the roasted mix is prevented. It is preferable to cool or partly to cool the roasted mix under a partial pressure of oxygen that is appreciably in excess of the partial pressure of oxygen in the atmosphere, say under a minimum partial pressure of oxygen of 200 millimeters of mercury. Alternatively, the roasted mix may be rapidly cooled with a water spray or by other means.

Having obtained a cooled, roasted mix containing an alkaline earth metal chromate, it is necessary to extract the chromate from it.

The highly advantageous way we have discovered of recovering the chromium values as calcium chromate from a roasted mix containing alkaline earth metal chromate, prepared by this or any other method, comprises the steps of leaching the roasted mix with an aqueous solution containing dissolved ammonia and dissolved carbon dioxide, and then saturating the resultant aqueous solution of ammonium chromate with lime to form an aqueous solution of calcium chromate. The preferred way of carrying out this process is shown in the accompanying drawing, which is a flow sheet.

The freshly roasted mix is delivered by a conveyor 15 to a vessel 16 in which it is partially extracted with an aqueous liquor containing ammonia and carbon dioxide in solution for at least 1 hour at 20° C. At the end of this time the liquor contains ammonium chromate and free ammonia. The contents of the vessel 16 then pass to a filter 17, from which the partially extracted frit is passed to another vessel 18 in which it is further extracted hot. The liquor from the filter 17 flows to a vessel 19 in which it is treated with hydrated lime at room temperature until no more lime will dissolve. If there is any excess of lime, the contents of the vessel 19 are passed through a filter 20, from which the liquor flows to a vessel 21. If there is no excess of lime the filter 20 may be omitted and the liquor may flow straight from the vessel 19 to the vessel 21. In the vessel 21 the temperature of the liquor is raised to about 90° C., with the result that calcium chromate is precipitated. The contents of this vessel 21 then pass through a filter 22 in which the precipitated calcium chromate is removed and from which it is passed to a drier 23. It is here dried at 110° C. and forms the desired product. The liquor from the filter 22 flows to a vessel 24 in which it is cooled and saturated by carbon dioxide introduced through a pipe 25. The resultant carbonated ammoniacal liquor then flows to the vessel 18, where it is used to leach the partially extracted roasted mix. This extraction takes place at about 75° C. and requires at least 1 hour. The contents of the vessel 18 are then passed to a filter 26, in which the solids are separated and discarded as indicated at 27, whereas the liquor containing ammonium carbonate and ammonium chromate passes to the vessel 16 to take part in the cold extraction of further roasted mix.

It is found that in the vessels 16 and 19 the temperature should as far as possible be kept at about 20° C. if the best results are to be obtained.

In any process for the extraction of chromium from ore the removal of impurities from the end product and the recovery of chromium in high yield are very important. The extraction process carried out according to our invention ensures that the calcium chromate produced is of high purity. The common impurities are removed from the chromate in the course of the process, except for the sulphate ion which must and readily can be kept at a low level by ensuring that the raw materials and fuel for roasting have low sulphur content.

A detailed example of a process carried out as shown in the drawing will now be given, all parts being by weight unless otherwise stated.

8,000 parts of roasted lime-chromate ore mix containing 2,650 parts of calcium chromate and 550 parts of free lime (CaO) were extracted at about 20° C. for 2 hours with recycled filtered liquor containing 4,300 parts ammonium chromate, 400 parts ammonium carbonate in 20,000 parts water. The carbonate ion was precipitated as insoluble calcium carbonate and part of the ammonium chromate was converted into soluble calcium chromate, according to the equations:

$$CaO + (NH_4)_2CO_3 + H_2O = CaCO_3 + 2NH_4OH$$

$$CaO + (NH_4)_2CrO_4 + H_2O = CaCrO_4 + 2NH_4OH$$

The reaction mixture was then filtered and to the filtrate which contained 2,920 parts ammonium chromate, 710 parts calcium chromate, 280 parts free ammonia in 16,700 parts water was added hydrated lime amounting to 1,140 parts CaO. This mixture was stirred for 2 hours at about 20° C. to yield soluble calcium chromate according to the equation:

$$Ca(OH)_2 + (NH_4)_2CrO_4 \rightarrow CaCrO_4 + 2NH_4OH$$

The solution was subsequently heated to 90° C. to precipitate calcium chromate, according to the equation:

$$CaCrO_4 \text{ (soluble)} \rightarrow CaCrO_4 \text{ (insoluble)}$$

The precipitate was filtered off and dried at 110° C. to give 2,200 parts of calcium chromate.

The filtrate containing 580 parts ammonium chromate, 900 parts calcium chromate and 800 parts ammonia in 16,700 parts water was treated with sufficient carbon dioxide to convert the soluble calcium chromate and the free ammonia into calcium carbonate, ammonium chromate and ammonium bicarbonate, according to the equations:

$$CaCrO_4 + 2NH_4OH + CO_2 = (NH_4)_2CrO_4 + CaCO_3 + H_2O$$

$$2NH_4OH + CO_2 = (NH_4)_2CO_3 + H_2O$$

$$(NH_4)_2CO_3 + CO_2 + H_2O = 2NH_4HCO_3$$

The carbonated liquor containing 1,450 parts ammonium chromate, 2,790 parts ammonium bicarbonate, 580 parts calcium carbonate and 16,400 parts water was then used to extract the filter cake from the filtration after the initial extraction of the roasted mix. The filter cake consisted of 2,790 parts calcium chromate, 420 parts calcium carbonate, 580 parts ammonium chromate, 50 parts ammonia and 3,300 parts water, and the extraction step involved stirring the liquor and the filter cake at about 75° C. for 2 hours. During this extraction, the bulk of the calcium chromate was converted into soluble ammonium chromate and insoluble calcium carbonate and the ammonium bicarbonate present was mostly decomposed, according to the equations:

$$2NH_4HCO_3 + CaCrO_4 = (NH_4)_2CrO_4 + CaCo_3 + CO_2 + H_2O$$

$$2NH_4HCO_3 = (NH_4)_2CO_3 + CO_2 + H_2O$$

After filtration, the residue, 265 parts calcium chromate and 2,620 parts calcium carbonate, was discarded and the filtered liquor was reacted with a further quantity of roasted lime-chrome ore mix.

We claim:
1. A process for the recovery of chromium values as calcium chromate from a roasted mix containing alkaline earth metal chromate comprising the steps of:
   (I) partly leaching said roasted mix in a first leaching step with a leach liquor containing, in a dissolved state, ammonia and carbon dioxide to yield an aqueous solution containing ammonium chromate and a partially extracted insoluble mix, and removing the insoluble material to obtain a liquor containing, in a dissolved state, ammonia and ammonium chromate;
   (II) treating, at room temperature, the liquor produced in stage (I), after removal of the insoluble material, with lime to yield an aqueous solution containing dissolved calcium chromate and ammonia;
   (III) heating the solution produced in stage (II) to a temperature sufficient to precipitate calcium chromate, separating the solid calcium chromate from the mother liquor containing dissolved calcium chromate and ammonia, and drying the separated calcium chromate precipitate;

(IV) cooling and carbonating the mother liquor produced in stage (III) to give a suspension of calcium carbonate in a solution containing ammonium bicarbonate and ammonium chromate;

(V) leaching the partially extracted roasted mix from stage (I) with the carbonated mother liquor from stage (IV) so as to yield an extracted residue and leach liquor containing, in a dissolved state, ammonia, carbon dioxide and ammonium chromate;

(VI) discarding the extracted residue and using the leach liquor for leaching a fresh quantity of roasted mix.

2. A process according to claim 1 in which said first leaching step is carried out at about 20° C. for at least 1 hour and said second leaching step is carried out at about 75° C. for at least 1 hour.

3. A process according to claim 1 in which said aqueous solution of calcium chromate is heated to about 90° C. to precipitate the calcium chromate, and said precipitated calcium chromate is subsequently dried at about 100° C.

4. A process as in claim 1 for the recovery of chromium values as calcium chromate wherein:

(a) the roasted mix containing alkaline earth metal chromate comprises calcium chromate and free lime, and during said initial partial leaching step insoluble calcium carbonate and a liquor containing in a dissolved state ammonia and ammonium chromate is produced; and (b) the insoluble material which is removed in step (I) comprises calcium carbonate.

References Cited

UNITED STATES PATENTS

| 725,501 | 4/1903 | Spence et al. | 23—56 |
| 747,255 | 12/1903 | Spence et. al. | 23—56 |

FOREIGN PATENTS

| 2,211 | 12/1903 | Great Britain. |
| 666,628 | 2/1952 | Great Britain. |

OTHER REFERENCES

Handbook of Chemistry and Physics, 43rd edition, 1961, pp. 518, 550 and 551, published by the Chemical Rubber Publishing Co.

OSCAR R. VERTIZ, *Primary Examiner.*

B. H. LEVENSON, *Assistant Examiner.*